United States Patent Office 3,350,299
Patented Oct. 31, 1967

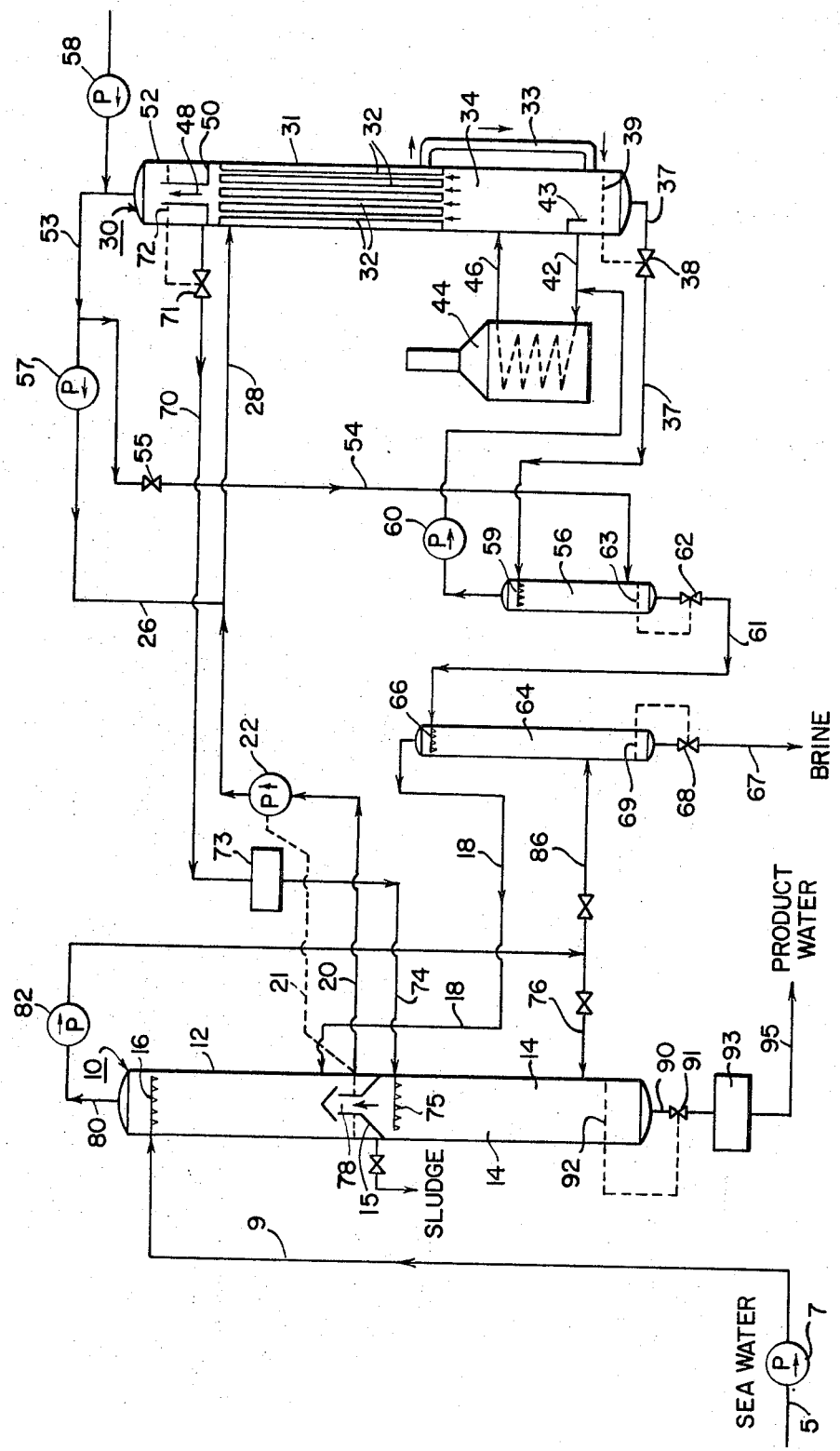

3,350,299
RECOVERY OF DESALTED WATER
FROM BRINE
Howard V. Hess, Glenham, and Frank E. Guptill, Jr., Fishkill, N.Y., assignors to Texaco Inc., New York, N.Y., a corporation of Delaware
Filed Oct. 21, 1963, Ser. No. 317,756
15 Claims. (Cl. 210—22)

The present invention relates to a novel process and apparatus for separating fresh water from brine. The process is applicable to the recovery of salt-free water from brines and to the concentration of various brines for the recovery of soluble salts contained therein.

In one of its more specific aspects, the present invention is concerned with a process for separating water from brine wherein a hot hydrocarbon liquid under pressure is brought into contact with heated brine to form a complex substantially free from inorganic compounds with water from the brine, separation of the complex from the residual brine, decomposition of the complex into its constituents. The term "brine" is used in a broad sense to denote the entire range of concentrations of water soluble inorganic compounds in water, for example, natural saline water containing sodium chloride, including brackish water, sea water, and saturated or nearly saturated brines, such as the brine in Great Salt Lake or brines obtained from wells. In addition to sodium chloride-containing solutions, other brines to which the process may be aplied include aqueous solutions of dissolved mineral salts, for example, halides, carbonates and sulfates of sodium, potassium, lithium, calcium, mangnesium, zinc and copper.

The present invention involves a novel desalination process which is dependent upon contact of hot brine with a hot hydrocarbon liquid characterized by the property of extracting a greater amount of water at a high temperature (e.g., at a temperature of 500° F. or above) than at a lower temperature, whereby water is extracted from the brine by the hydrocarbon and forms a complex which is immiscible with the residual brine and may be separated therefrom by gravity. After separation from the residual brine, the complex is decomposed by reducing the temperature sufficiently below the extraction temperature to cause the hydrocarbon and water to separate from one another as two liquid phases; the water phase or the residual brine may be recovered as product and the hydrocarbon phase recycled to the extraction zone. The basic process is disclosed in the copending U.S. patent application of Howard V. Hess, Ser. No. 144,240, filed Oct. 10, 1961, now abandoned. The present application is directed to improvements in the basic process.

The term "complex" is used herein to designate the solution of water in hydrocarbon liquid, especially the extract leaving the extraction zone, since it is not entirely certain at this time whether it is a true solution of water in hydrocarbon liquid or a hydrocarbon solution containing a hydrate of the water and hydrocarbon.

For greater efficiency the present process should be operated at a temperature above 500° F. for the extraction step, after which the temperature is reduced below the extraction temperature for the phase separation step, advantageously by at least 50° below the extraction temperature to assure breaking out the major part of the water. When using aliphatic hydrocarbons, somewhat greater extraction efficiency is obtained if the temperature is kept above 550° F.

By way of illustration, n-decane has the property of extracting 22.2% its weight of water at 575° F., 9% at 550° F., and only 3.3% at 500° F. Consequently, with the extraction process operating at 575° F., and the decomposition step at 500° F., there is a recovery of water in the amount of about 19 percent of the n-decane.

The operating pressure of the extraction step is sufficiently high to prevent the formation of a separate vapor phase at the operating temperature, normally, greater than 1000 p.s.i.g. and sometimes as high as 3000 p.s.i.g. Usually the phase break and separation part of the system is at the same operating pressure.

The upper temperature limit should be below the temperature at which vaporization can occur in the extractor to ensure that the fluids in the system are in liquid phase.

Normally liquid hydrocarbons are generally suitable for use in the process of this invention. Hydrocarbons and mixtures of hydrocarbons containing from 6 to 30 carbon atoms per molecule may be used. Hydrocarbons of 8 to 20 carbon atoms, particularly, 9 to 12, per molecule are preferred. Various petroleum fractions including kerosene, naphtha, odorless spirits, gasoline, and lubricating oils may be used in the process. Examples of individual hydrocarbon types which can be used in the process of the present invention, either alone or in admixture with one another, are the aliphatic hydrocarbons, including hexane, 2,3-dimethylbutane, heptanes, octanes, isooctane, nonanes, decanes, propylene tetramer, hexadecane, 2-methyl-1-pentene, etc.; alicyclic hydrocarbons, e.g., methylcyclopentane, cyclohexane, methylcyclohexane, dimethylcyclohexane, ethylcyclohexane, tetralin, isopropylcyclohexane, cyclohexene, pinene, etc.; and aromatic hydrocarbons, e.g., benzene, cumene, xylenes, methylnaphthalenes, etc.

The preferred hydrocarbons are those which are stable under the temperature and pressure conditions employed in the process, for example, 550° F. to 650° F. and 1000 to 3000 p.s.i.g. The preferred hydrocarbons should have low toxicity and low solubility in water at ordinary temperatures and atomospheric pressure. In general, the saturated hydrocarbons are preferred for use in the process.

Preferred petroleum fractions useful in the present process include normal paraffin hydrocarbons containing 10 to 12 carbon atoms per molecule; isoparaffin hydrocarbons of 12 carbon atoms per molecule, e.g., the bottom fraction obtained from alkylation of butylenes with isobutane; aromatic hydrocarbons of 9 to 10 carbon atoms per molecule, e.g., aromatic hydrocarbons obtained by alkylation of benzene or toluene with propylene; propylene tetramer; a gasoline fraction containing hydrocarbons of 10 to 12 carbon atoms per molecule; and naphthenes containing 9 to 10 carbon atoms per molecule.

Some petroleum fractions may include impurities, e.g., sulfur compounds, but such impurities do not normally exist in sufficient quantity to adversely affect the use of the petroleum fractions in the process of the invention. These impurities tend to be removed from the hydrocarbons after a short period of use.

The figure illustrates diagrammatically an arrangement of apparatus for carrying out the process of this invention.

With reference to the figure, sea water at ambient temperature, for example 70° F., is drawn from a suitable source of supply through line 5 by pump 7 where its pressure is raised to an intermediate pressure, suitably in the range of 500 to 1000 p.s.i.g., and introduced through line 9 into the upper end of column 10. Column 10 is a vertical, cylindrical vessel divided into a brine heater section 12 in its upper part and a product water cooler section in its lower part by a trap tray 15. Sea water enters near the top section of 12 through a suitable distributor or sparger 16 which disperses it into hydrocarbon liquid.

The brine heater section 12 is maintained full of liquid, with hydrocarbon liquid as the continuous phase and brine as the discontinuous phase. Brine from distributor 16 flows downwardly in direct contact with upwardly flowing hot hydrocarbon liquid, from line 18 and from the upper part of water cooler section 14 as explained in more detail hereinafter.

Preheated brine is withdrawn from the lower part of brine heater section 12 of column 10 through line 20 suitably controlled by level control 21. The pressure of the brine is increased to extraction pressure, suitably in the range of 1000 to 2500 p.s.i.g., by pump 22 and mixed with hot hydrocarbon liquid from line 26. The resulting mixture of brine and hydrocarbon is passed through line 28 to a novel extractor column 30 forming a part of the present invention.

The column 30 preferably comprises a vertical, cylindrical pressure vessel with a heat exchanger 31 in its mid-section. The mixture of brine and hydrocarbon is introduced to the shell side of a shell and tube type heat exchanger 31 at the upper end of the exchanger. As the two phase mixture passes downwardly through the heat exchanger, it is heated by indirect heat exchange with hot extract comprising water in hydrocarbon flowing upwardly through the tubes 32 of the heat exchanger. The heated mixture is discharged from the lower part of the shell side of the heat exchanger through line 33 into the lower part of separator 34 in column 30 below the heat exchanger. The extract of salt-free water in hydrocarbon liquid formed on heating the mixture of brine and hydrocarbon in heat exchanger 31, suitably to a temperature in the range of 500 to 600° F., is separted from residual brine in separator 34. The upper end of separator 34 communicates with tubes 32 of heat exchanger 31. Concentrated brine separated from the hydrocarbon extract in separator 34 is withdrawn through line 37.

The complex or extract of water in hydrocarbon is drawn from separator 34 through line 42 to heater 44 where it is heated and returned to the separator 34 through line 46 to maintain the desired temperature in the separator. A suitable baffle 43 may be provided to minimize recirculation of heated extract. Complex comprising salt-free water in hydrocarbon liquid flows from the top of separator 34 up through tubes 32 in heat exchanger 31 where it is cooled by heat exchanger with the incoming mixture of brine and hydrocarbon liquid. On cooling in heat exchanger 31, water separates from the hydrocarbon liquid. The heat exchanger 31 is designed so that the velocity of flow of liquid up through tubes 32 insures entrainment of the separated water. A velocity of 10 feet per second is sufficient for tubes one inch in inside diameter, for example. The cooled hydrocarbon and separated water are discharged through riser 48 in trap tray 50 immediately above heat exchanger 31 into a separator 52.

Cooling of the complex in the heat exchanger releases water to form two immiscible liquid phases, one comprising fresh water containing only a very small amount of hydrocarbon, for example, less than one percent by weight and the other comprising hydrocarbon liquid phase containing a minor amount of water, for example, less than 10 percent by weight. The hydrocarbon liquid phase is withdrawn from the top of separator 52 through line 53. Part of the hydrocarbon liquid is passed through line 54 as controlled by valve 55 to water cooler 56 and the remainder passed by pump 57 through line 26 into line 28 where it is mixed with preheated sea water from brine preheater 12, as previously described. Make-up hydrocarbon liquid to replace losses is added as required to line 53 by pump 58.

Concentrated brine from the bottom of separator 34 is discharged through line 37 as controlled by valve 38 responsive to liquid level 39 of brine in separator 34, into the upper part of brine cooler 56. Brine cooler 56 is provided with a distributor or sparger 59 to disperse the hot brine into hydrocarbon liquid entering the lower part of brine cooler 56 through line 54. The heated hydrocarbon liquid is drawn from the top of brine cooler 56 by pump 60 and introduced into line 42 of heater 44 for recirculation to separator 34. In the brine cooler 56, direct heat exchange between concentrated hot brine from line 37 and cooler hydrocarbon liquid from line 54 effects cooling of the brine and heating of the hydrocarbon liquid. The brine cooler 56 is operated with hydrocarbon as the continuous phase. Brine collected at the bottom of brine cooler 56 is discharged through line 61, as controlled by valve 62 responsive to the liquid level 63 of brine in the lower part of brine cooler 56, to the top of a second brine cooler 64. Brine cooler 64 is a vertical, cylindrical column provided with a sparger 66 at the upper part of the column to distribute the brine in the hydrocarbon liquid. As in the other liquid-liquid heat exchangers, the hydrocarbon liquid is maintained as the continuous phase in brine cooler 64. Cooled, concentrated brine is discharged through line 67 as controlled by valve 68, suitably in response to the liquid level 69 of brine in cooler 64.

The water phase separated from the hydrocarbon phase in separator 52 is withdrawn through line 70 as controlled by valve 71, suitably in response to the level of the interface 72 between the hydrocarbon liquid and water in separator 52. This separated water is passed to a turbine 73 where the pressure of the water is reduced to the lower pressure existing in column 10 and introduced through line 74 to a sparger 75 in the upper part of water cooler section 14 of column 10. In the water cooler 14, desalted water descends countercurrent to upwardly flowing relatively cool hydrocarbon liquid supplied to the lower part of the column through line 76. Water cooler 14 is operated liquid full, with hydrocarbon liquid as the continuous phase. In water cooler 14, the water is cooled to a temperature below its boiling point, and preferably to near-atmospheric temperature, suitably in the range of 50 to 200° F., while the cool hydrocarbon liquid entering line 76 is heated suitably to a temperature in the range of 450 to 500° F.

The heated hydrocarbon liquid leaves the top of cooler 14 through the chimney 78 in trap tray 15 and enters the lower part of brine preheater 12 where it is mixed with additional heated hydrocarbon liquid suitably at a temperature in the range of 450 to 500° F., from brine cooler 64 entering the lower part of brine preheater 12 through line 18. The hydrocarbon flows upwardly through brine heater 12 countercurrent to the flow of brine from line 9 and is cooled to a temperature near that of the incoming sea water from line 9. The cooled hydrocarbon liquid is withdrawn from the top of brine heater 12 through line 80 by means of pump 82. Part of the cooled brine is supplied to the lower part of water cooler 14 through line 76 while the remainder is introduced into the lower part of brine cooler 64 through line 86.

Cooled, desalted water is discharged from the lower end of water cooler 14 in column 10 through line 90 as controlled by valve 91, suitably in response to the level of the water-hydrocarbon interface 92 in the lower part of water cooler 14. The water pressure is reduced from the pressure in column 10 to atmospheric pressure by means of turbine 93 which recovers power useful for supplying part of the power requirements of the plant. Water recovered from the brine is discharged through line 95 as product of the process.

As a specific example of the operation of this process, flow rates and operating conditions are given for a plant for the production of ten million gallons per day of fresh water from sea water. In this specific example, cumene is employed as the hydrocarbon liquid and sea water containing 3.5 percent salt is treated from the recovery of fresh water.

Sea water at 70° F. is supplied to brine preheater 12 at 690 p.s.i.g. at the rate of 2,001 tons per hour (t./hr.). The hydrocarbon is supplied to brine preheater 12 through line 18 at the rate of 400 t./hr. at 470° F. and through chimney 78 of trap tray 15 at the rate of 3,221 t./hr. at 470° F., together with 182.5 t./hr. of fresh water from water cooler 14. Preheated brine at 460° F. is drawn from the bottom of brine heater 12 through line 20 at the rate of 2,183.5 t./hr. together with 16.5 t./hr. of hydrocarbon. The increase in quantity of brine in brine heater 12 results from dilution of the incoming sea water with recycled fresh water entering with the hydrocarbon feed to the brine heater. The preheated brine at 460° F. is raised in pressure to 1680 p.s.i.g. and mixed with 1,708.5 t./hr. of hydrocarbon at 480° F. containing 111 t./hr. of water. The resulting mixture at 467° F. enters heat exchanger 31 where it is heated to 580° F. and discharged through line 33 into separator 34. In separator 34, residual saturated brine (26.3 weight percent salt) separates from the hydrocarbon-water extract phase and is discharged through line 37 at the rate of 266 t./hr.

The resulting extract comprises 50 percent hydrocarbon and 50 percent water by weight. The extract is heated from 580 to 590° F. by heater 44. The hydrocarbon-water extract leaving the top of the separator at 590° F. flows through tubes 32 of heat exchanger 31 at the rate of 4,099 t./hr. In the heat exchanger, the extract is cooled from 590° F. to 480° F. by indirect heat exchange with the mixture of hydrocarbon and brine on the shell side of the heat exchanger 31. Cooling of the extract in tubes 32 causes the water to separate from the hydrocarbon liquid.

To prevent backflow of separated water, a linear velocity of ten feet per second is maintained in one inch I.D. heat exchanger tubes 32. The hydrocarbon and separated water leaving the tubes of heat exchanger 31 flow into separator 52 through chimney 48 of tray 50.

In separator 52, operating at 1625 p.s.i.g. and 480° F., the liberated water separates by gravity from the hydrocarbon and is discharged through line 70 to turbine 73 at the rate of 1,917.5 t./hr., together with 16.5 t./hr. of hydrocarbon. In turbine 73, the pressure of the water stream is reduced to 660 p.s.i.g. The water is cooled in cooler 14 from 480° F. to 90° F. by direct contact with hydrocarbon liquid and discharged through a turbine 93 as product at the rate of 1,735 t./hr.

The water product from line 95 is substantially completely free from hydrocarbon liquid as a result of cooling in cooler 14. Trace amounts of hydrocarbon liquid can be removed from the product water to improve its potability by filtration through charcoal, not illustrated in the drawing.

The hydrocarbon phase from separator 52 is discharged through line 53 at the rate of 2,033 t./hr., together with 132 t./hr. water, at 1625 p.s.i.g. and 480° F. The stream is split so that 1,708.5 t./hr. of hydrocarbon, together with 111 t./hr. of water, is pumped through line 26 at 1650 p.s.i.g. into admixture with the preheated sea water from pump 22. The remainder of the hydrocarbon phase, 324.5 t./hr. of hydrocarbon liquid containing 21 t./hr. of water, is passed through line 54 to brine cooler 56 operating at 1640 p.s.i.g. In brine cooler 56, the hydrocarbon liquid phase is contacted with concentrated brine from the bottom of separator 34 at 590° F. at the rate of 266 t./hr., heating the hydrocarbon liquid to 580° F. and cooling the concentrated brine to 490° F. The preheated hydrocarbon from brine cooler 56, 324.5 t./hr. of hydrocarbon liquid together with 21 t./hr. of water, is pumped, by pump 60, to line 42 of heater 44 for reuse. Concentrated brine at 490° F. and 1640 p.s.i.g. is discharged through valve 62, where its pressure is reduced, and supplied at the rate of 266 t./hr. to a second brine cooler 64 operating at 690 p.s.i.g. In brine cooler 64, the concentrated brine is cooled to 90° F. by direct contact with 400 t./hr. of hydrocarbon liquid from line 86 as described above. The hydrocarbon liquid, heated from 80° F. to 370° F. in brine cooler 64 is supplied at the rate of 400 t./hr. through line 18 to brine preheater 12. Hydrocarbon liquid at 80° F. is drawn from the top of brine heater 12 through line 80 by pump 82 at the rate of 3,604.5 t./hr. and passed to water cooler 14 and brine cooler 64. The cool hydrocarbon from pump 82 is supplied to water cooler 14 through line 76 at the rate of 3,204.5 t./hr. and to brine cooler 64 through line 86 at the rate of 400 t./hr. Concentrated brine is discharged through line 67 at the rate of 266 t./hr.

Heating of the brine in brine heater section 12 of column 10 to an elevated temperature, in this example 460° F., causes scale-forming constituents of the brine, e.g., calcium carbonate, magnesium hydroxide and calcium sulfate, to precipitate in the form of sludge. This sludge is accumulated on trap tray 15 and drawn off with a part of the sea water, as required, through line 97, controlled by valved 98. Removal of scale-forming constituents in this manner eliminates, or substantially eliminates, scale formation in heat exchanger 31 of column 30. Sludge may be recycled for seeding, if desired, to line 9.

Although water cooler 14 is described and illustrated for operation with hydrocarbon liquid as the continuous phase, it can be operated with water as the continuous phase. In this event, the level of the water-hydrocarbon interface 92 is maintained at or near the point of introduction of water to the water cooler.

We claim:

1. A process for extracting water from brine comprising passing relatively cool brine into direct countercurrent contact with relatively hot hydrocarbon liquid in a first contacting zone whereby said brine is heated to an elevated temperature and said hydrocarbon is cooled under sufficient pressure to maintain said brine and said hydrocarbon in liquid phase; passing preheated brine from said first contacting zone into admixture with hot hydrocarbon liquid, passing the resulting mixture in indirect heat exchange with extract from a source hereinafter defined thereby heating said mixture to a temperature effective for extracting water from said brine and forming an extract consisting essentially of relatively salt-free water in hydrocarbon, discharging residual brine containing an increased salt concentration and resulting extract or water in hydrocarbon into a separation zone and separating residual brine from said extract, passing said extract in countercurrent indirect heat exchange with said mixture of hydrocarbon and brine thereby cooling said extract to a temperature effective for liberation of water from said extract to form a water phase and a hydrocarbon liquid phase, and separating relatively salt-free water liberated from said extract from said hydrocarbon liquid phase.

2. A process according to claim 1 wherein said brine is heated to a temperature in the range of 450 to 500° F. by said direct countercurrent contact with hot hydrocarbon liquid in said first contacting zone.

3. A process according to claim 1 wherein said extract is cooled prior to said step of separating liberated water from said hydrocarbon liquid phase to a temperature in the range of 450 to 500° F.

4. A process according to claim 3 wherein said hydrocarbon liquid phase resulting on liberation of water from said extract and separated from said water at 450 to 500° F. is admixed with brine from said first contacting zone preheated to 450 to 500° F. by said direct contact with hot hydrocarbon liquid in said first contacting zone.

5. A process according to claim 4 wherein resulting mixture of hot brine and hydrocarbon liquid is heated by indirect heat exchange with extract of water in hydrocarbon liquid to a temperature in the range of 550 to 650° F.

6. A process according to claim 5 wherein said extract is heated to a temperature above the temperature of said mixture prior to indirect heat exchange with said mixture.

7. A process according to claim 1 wherein the pressure in said first contacting zone is within the range of 500 to 1000 p.s.i.g. and the pressure in said separation zone is within the range of 1000 to 3000 p.s.i.g.

8. A process according to claim 1 wherein a part of said separated hydrocarbon liquid phase is passed into direct countercurrent contact with said residual brine separated from said extract thereby cooling said brine and preheating said hydrocarbon liquid.

9. A process according to claim 8 wherein said residual brine is further cooled by direct countercurrent contact with relatively cool hydrocarbon liquid from said brine preheating step at the pressure of said brine preheating step and resulting preheated hydrocarbon is returned to said brine preheating step.

10. A process according to claim 1 wherein said separated water is passed into direct countercurrent contact in a second contacting zone with relatively cool hydrocarbon liquid from said first contacting zone thereby cooling said water and heating said hydrocarbon liquid, and resulting heated hydrocarbon liquid is returned to said first contacting zone.

11. A process according to claim 1 wherein said hydrocarbon liquid consists essentially of hydrocarbons containing not less than 6 and not more than 30 carbon atoms per molecule.

12. Apparatus for extracting fresh water from brine comprising a cylindrical pressure vessel, a shell and tube heat exchanger disposed in the mid section of said pressure vessel, a substantially unobstructed first separator disposed in one end of said vessel and in communication at its upper end with one end of said tubes of said heat exchanger, a substantially unobstructed second separator in the other end of said vessel in communication with the other ends of said tubes of said heat exchanger, means for introducing a mixture of hydrocarbon and brine to the shell side of said heat exchanger to flow countercurrent to liquid in said tubes, means for withdrawing resulting heated mixture comprising hydrocarbon extract and residual brine from the shell side of said heat exchanger and introducing said heated mixture into an intermediate point in said first separator, means for withdrawing concentrated brine from the lower part of said first separator, means for supplying heat to said extract in said first separator whereby hot extract flows through said tubes of said heat exchanger supplying heat to said mixture by indirect heat exchange and thereby cooling said extract to form a water phase and a separate hydrocarbon liquid phase, means for conducting said phases from said heat exchanger tubes to an intermediate point in said second separator, means for withdrawing water from the lower part of said second separator, and means for withdrawing said separated hydrocarbon liquid from the upper part of said second separator.

13. In a process for extracting water from brine containing scale-forming constituents wherein said brine is heated by indirect heat exchange under scale-forming conditions, the improvement which comprises passing relatively cool brine containing said scale-forming constituents into direct contact in a contacting zone at elevated pressure with relatively hot hydrocarbon liquid as the continuous phase and brine as the discontinuous phase wherein said brine is heated by direct contact with said hydrocarbon liquid to a temperature not substantially below the temperature of said indirect heat exchange step whereby scale-forming constituents are precipitated as a solid precipitate, withdrawing preheated brine substantially free from said solid precipitate from said contacting zone and passing said preheated brine containing a reduced content of scale-forming constituents to said indirect heat exchange zone for further heating, and separately withdrawing preheated brine containing solid precipitate from said contacting zone.

14. A process according to claim 13 wherein solid precipitate formed in said contacting zone is recirculated to said contacting zone with said relatively cool brine.

15. A process according to claim 13 wherein said brine and said hydrocarbon liquid are countercurrently contacted with one another in said contacting zone whereby said brine is heated to a temperature approaching that of said hot hydrocarbon liquid and said hydrocarbon liquid is cooled to a temperature approaching that of said brine.

References Cited
UNITED STATES PATENTS

| | | | |
|---|---|---|---|
| 965,148 | 7/1910 | Angell | 210—56 |
| 1,553,067 | 9/1925 | Burnette | 210—56 |
| 2,298,791 | 10/1942 | Harrington | 208—311 |
| 2,789,083 | 4/1957 | Hardy | 210—56 |

JOSEPH SCOVRONEK, *Acting Primary Examiner.*

MORRIS O. WOLK, *Examiner.*

E. G. WHITBY, *Assistant Examiner.*

UNITED STATES PATENT OFFICE

CERTIFICATE OF CORRECTION

Patent No. 3,350,299                          October 31, 1967

Howard V. Hess et al.

It is hereby certified that error appears in the above numbered patent requiring correction and that the said Letters Patent should read as corrected below.

Column 1, line 30, for "aplied" read -- applied --; line 52, for "mangnesium" read -- magnesium --; column 3, line 28, for "heatingthe" read -- heating the --; line 30, for "separted" read -- separated --; column 5, line 73, for "370° F." read -- 470° F. --; column 6, line 42, for "or" read -- of --.

Signed and sealed this 3rd day of December 1968.

(SEAL)
Attest:

Edward M. Fletcher, Jr.                        EDWARD J. BRENNER
Attesting Officer                               Commissioner of Patents